United States Patent
Balinsky et al.

(10) Patent No.: US 8,123,126 B2
(45) Date of Patent: Feb. 28, 2012

(54) ANTI-COUNTERFEIT PACKAGING

(75) Inventors: Helen Balinsky, Cardiff (GB); James Thomas Edward McDonnell, Bristol (GB); Thomas Rathbone, Wolverhampton (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/374,615

(22) PCT Filed: Jul. 20, 2007

(86) PCT No.: PCT/EP2007/057519
§ 371 (c)(1),
(2), (4) Date: Oct. 19, 2009

(87) PCT Pub. No.: WO2008/009743
PCT Pub. Date: Jan. 24, 2008

(65) Prior Publication Data
US 2010/0052308 A1 Mar. 4, 2010

(30) Foreign Application Priority Data
Jul. 21, 2006 (GB) .................................. 0614466.1

(51) Int. Cl.
*G06K 5/00* (2006.01)
(52) U.S. Cl. ................... 235/380; 382/100; 713/165
(58) Field of Classification Search ............... 235/380; 382/100; 713/165
See application file for complete search history.

(56) References Cited

U.S. PATENT DOCUMENTS

| | | | |
|---|---|---|---|
| 5,434,917 A | 7/1995 | Naccache et al. | |
| 6,212,635 B1 * | 4/2001 | Reardon | 713/165 |
| 6,708,618 B1 | 3/2004 | Tsai | |
| 2005/0276442 A1 * | 12/2005 | Alasia et al. | 382/100 |
| 2006/0243793 A1 * | 11/2006 | Siewert | 235/380 |
| 2007/0257046 A1 * | 11/2007 | Rault et al. | 220/675 |

FOREIGN PATENT DOCUMENTS

| | | |
|---|---|---|
| EP | 1477940 B1 | 8/2007 |
| GB | 2324065 A | 10/1998 |

* cited by examiner

*Primary Examiner* — Allyson Trail (57) ABSTRACT

Anti-counterfeit marking for a product, comprising: a tamper evident marker attached to or integrated with a product or packaging for a product and having a random mark; and an electronic memory element containing data about the random mark, the memory element being attached to or integrated with the product or packaging for the product in a tamper evident manner.

20 Claims, 5 Drawing Sheets

The original image (cropped):

Fig. 4a

The first share:

Fig. 4b

The second share:

ANTI-COUNTERFEIT PACKAGING

FIELD OF THE INVENTION

The present invention relates generally to a packaging and a method of using such a packaging, and more specifically to an anti-counterfeit packaging and method of using such a packaging.

SUMMARY OF THE INVENTION

According to a first aspect of the present invention there is provided an anti-counterfeit packaging containing a memory device intimately associated with the packaging in a tamper evident manner and including data therein to enable a further identifier on the packaging to be validated.

According to a second aspect of the present invention there is provided a anti-counterfeit marking for a product, comprising: a tamper evident marker attached to, integrated with or encapsulating a product or a packaging for a product, wherein the tamper evident marker comprises a random distribution of elements within a substrate or a random mark; and a memory element containing data about the marker, the memory element being attached to or integrated with the product or packaging for the product in a tamper evident manner.

According to a third aspect of the present invention there is provided a method of detecting a counterfeit product comprising the steps of reading from a memory device attached to a product or the packaging of the product in a tamper evident manner data concerning a further random identifier which is also attached to the product or the packaging for the product, taking a validating measurement of the random identifier, and comparing the validating measurement with the data from the memory device.

BRIEF DESCRIPTION OF THE DRAWINGS

The present invention will further be described, by way of non-limiting example only, with reference to the accompany drawings, in which.

DESCRIPTION OF PREFERRED EMBODIMENT OF THE PRESENT INVENTION

Counterfeit goods represent a continued economic threat to bona fide manufactures. Furthermore, counterfeit drugs also represent a health threat.

Workers in the field have proposed several schemes for identifying counterfeit products. The paper "An anti-counterfeiting strategy using numeric tokens, International Journal of Pharmaceutical Medicine 19(3), 163-171 (2005)" discloses printing numeric tokens on packaging. The number of numeric tokens greatly exceeds the number of products such that if a counterfeiter guesses a numeric token, then there is a high likelihood that the token will not have been used. A customer, such as the recipient of the drugs or a pharmacist checks the identity of a token at the time of use by phoning a dedicated phone number or making an internet query to a database containing lists of valid tokens. A drawback with such an approach is that the query could be subverted by spoofing, with the response from the database being intercepted and being replaced by a fake response.

Other approaches include the provision of 2-D printed symbols, such as 2-D bar codes and holograms. These tags are themselves fakeable and provide little evidence of validity unless a check is made of the remote database.

Electronic devices such as RF ID and memory spot have been used to provide unique (or at least rare) identities to give confidence in the authenticity of packaging. These devices do not encapsulate a product but instead are associated with a packaging by being securely attached to it or being an integrated part of it. While these devices are considered to provide "strong" security features because they are hard to manufacture, clone or impersonate the package security is still vulnerable because of their relatively weak association with the host packaging. Even when the electronic devices are attached to packaging in a tamper evident way the packaging itself is still vulnerable to tampering or modification or even re-use. Thus valid electronic devices can still be associated with counterfeit goods. This can be regarded as "an electronic device reuse attack". In one example of a reuse attack bona fide packaging may be carelessly disposed of or maliciously collected such that the electronic devices can be harvested and reused.

The inventors have realised that a tight association between different security methods can make the cost and difficulty of faking a packaging sufficiently great to make it uneconomical for the counterfeiters.

To raise the cost barrier embodiments of the present invention have a package identity (ID) split into several fragments incorporating different technologies, some being physical and some electronic.

Some validation steps for validating the identities are manual and non-automatable. This can also raise the counterfeiting cost per unit whilst only imposing a minor use or validation overhead to the consumer or customer.

Figure 1:
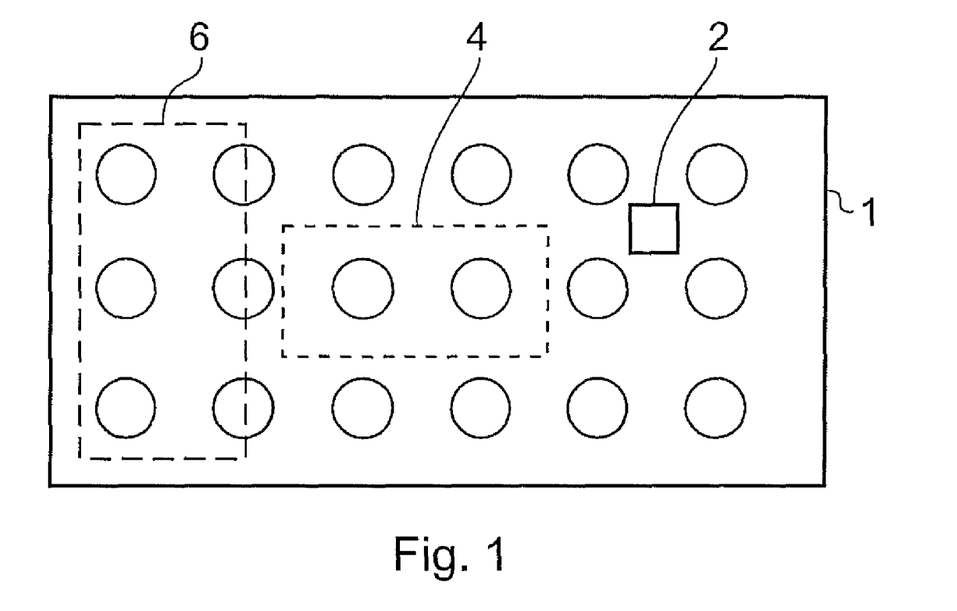
FIG. 1 schematically illustrates packaging for a pharmaceutical product and constituting an embodiment of the present invention.

The pharmaceutical packaging shown in FIG. 1 includes security measures In particular, the pharmaceutical packaging generally designated 1 which may, for example, be a blister pack has an electronic memory device 2 integrated into the pack 1 or attached to a surface of the blister pack 1 in a tamper evident manner. For example, essential connections within the electronic memory device 2 may be exposed to an adhesive which binds the memory device 2 to pharmaceutical packaging 1 such that an attempt to remove the memory device 2 from the packaging 1 almost inevitably ends up damaging the device 2 and rendering it inoperative. The memory device 2 is advantageously a remote reading device, such as an RF ID-tag or a memory spot device. Each of these can be interrogated without physical contact between the memory device 2 and its associated reader (not shown). However, devices requiring connections to be made may also be used. As noted above, the packaging can be designed such that the memory device is highly integrated with the packaging such that it is destroyed on proper opening of the packaging. Another example of packaging includes an antenna wrapped around or formed within a screw cap. When the cap is rotated relative to a bottle that it seals the antenna becomes disengaged from the chip and may physically damage the RF ID or memory spot chip in the process. A counterfeiter might intercept such a bottle and cut the bottom of the bottle such that the genuine contents can be extracted (and can be resold) and the bottle can then be carefully broken apart such that, the electronic device can be reused with a new bottle or packaging.

In order to guard against this the inventors have realised that an identity should be included as part of the packaging.

The packaging shown in FIG. 1 further includes one or both of a random marker, preferably in the form of a random visual marker 4 and a first share 6 of a visual cryptogram.

The random visual marker is a marker which makes use a randomising effect during its manufacture, such as the sprinkling of individual marker elements into the body of the marker 4 during its manufacture. Each marker is thus the result of a random scattering process and is both random and unique.

Figure 2:
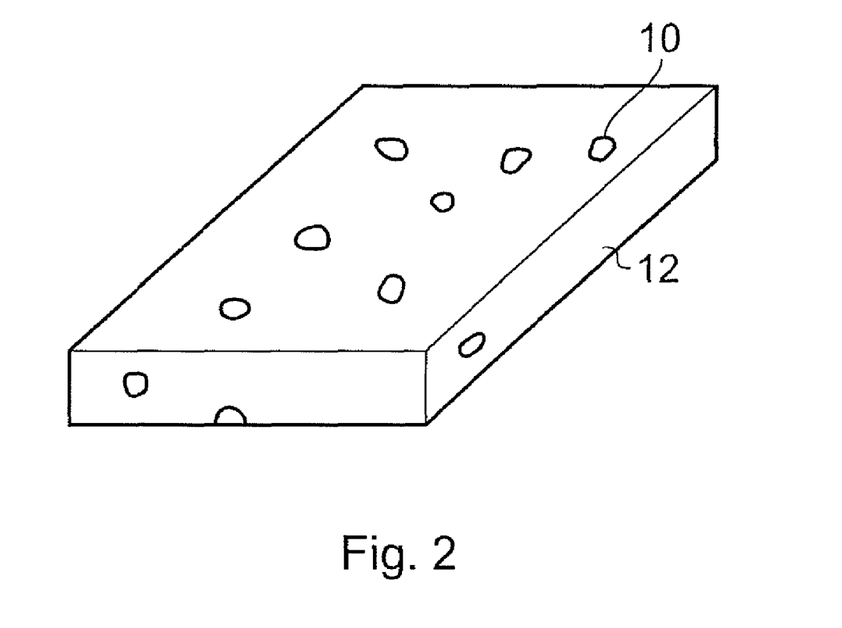
FIG. 2 is a perspective view of a random visual tag.

FIG. 2 schematically illustrates such a marker. This can be created by sprinkling items, such as glass beads into a slab of plastic as it cools. The beads need not be uniform and are selected so as to have different optical properties to the plastic block. Thus the beads 10 may have, for example, a different colour or a different refractive index to the plastic 12. The random nature of the sprinkling process means that each block has a unique signature and that each block cannot merely be faked by printing an image of it because a 2 dimensional print cannot replicate the scattering effect of the marker 4. Thus the block is substantially non-replicable. Bubbles of stress lines may also be formed in the block to act as markers. Techniques for creating, reading and characterising random markers are disclosed in WO2004/096573 and consequently do not need to be described in detail here.

Figure 4A:
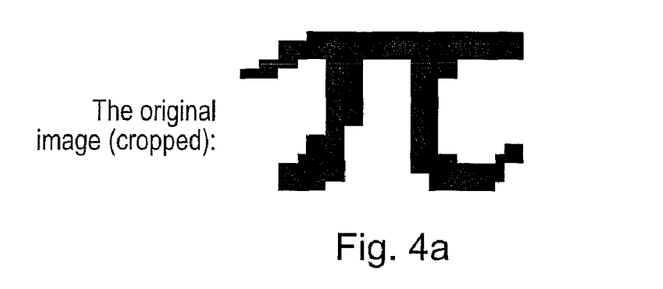
FIGS. 4a to 4c schematically demonstrate a image visually encrypted in a first share and a second share using visual cryptography.
Figure 4B:
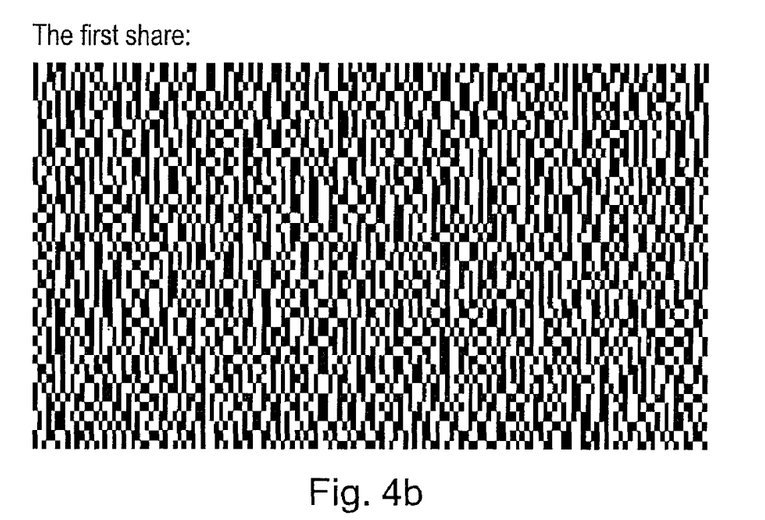
Figure 4C:
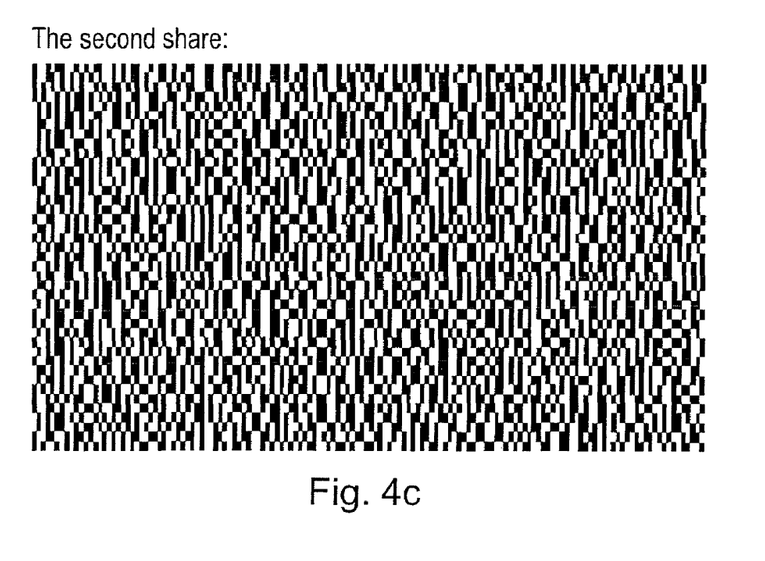

Once the block 4 had been characterised by a repeatable scanning process, for example by a trusted party such as the manufacturer, a descriptor of its characterisation can be stored in the memory of the memory element 2. Consequently a self contained interrogation station including a reader for characterising the block 4, and a reader for interrogating the memory element 2 can be used to scan the block (thereby taking a validating measurement of the block) and to retrieve the data about the block from the memory device so as to authenticate that the block 4 and the memory element 2 belong to one another and therefore give a high degree of confidence that the packaging has not been tampered with because of the near impossibility of removing the memory element 2 without rendering it inactive. The original packaging cannot be amended after the device or its contents are removed. If a counterfeiter, for example, attempts to reuse the device into a similar packaging with different a id, the information about the packaging id in the memory of the device and the actual packaging id will mot match. Advantageously the portion of memory storing the characterisation data for the block/security marker 4 can only be written to one time. The package can also contain a first share of a visual cryptogram. A visual cryptogram is a known technique for encoding an image between two or more shares which need to be superimposed in correct registration before the image encoded therein can be viewed. Thus the first share 6 can be integrally formed as part of a packaging and a second share (not shown) may also be shipped with the product or may be sent to a user via a different delivery channel. The memory device may encode the image which is stored in the visual cryptogram such that it can be made available to an end user who can then compare the image stored in the memory device and displayed by the device reader with the image displayed when the first and second shares are superimposed. The process of making visual pictograms need not be described in detail as it is known to persons skilled in the art, but papers on the subject and shareware for making visual cryptograms can be obtained from http://www.cacr.math.uwaterloo.ca/~dstinson. An example of an encoded image is shown in FIG. 4a together with examples of a first share shown in FIG. 4b and a second share shown in FIG. 4c for encoding the image.

Figure 3:
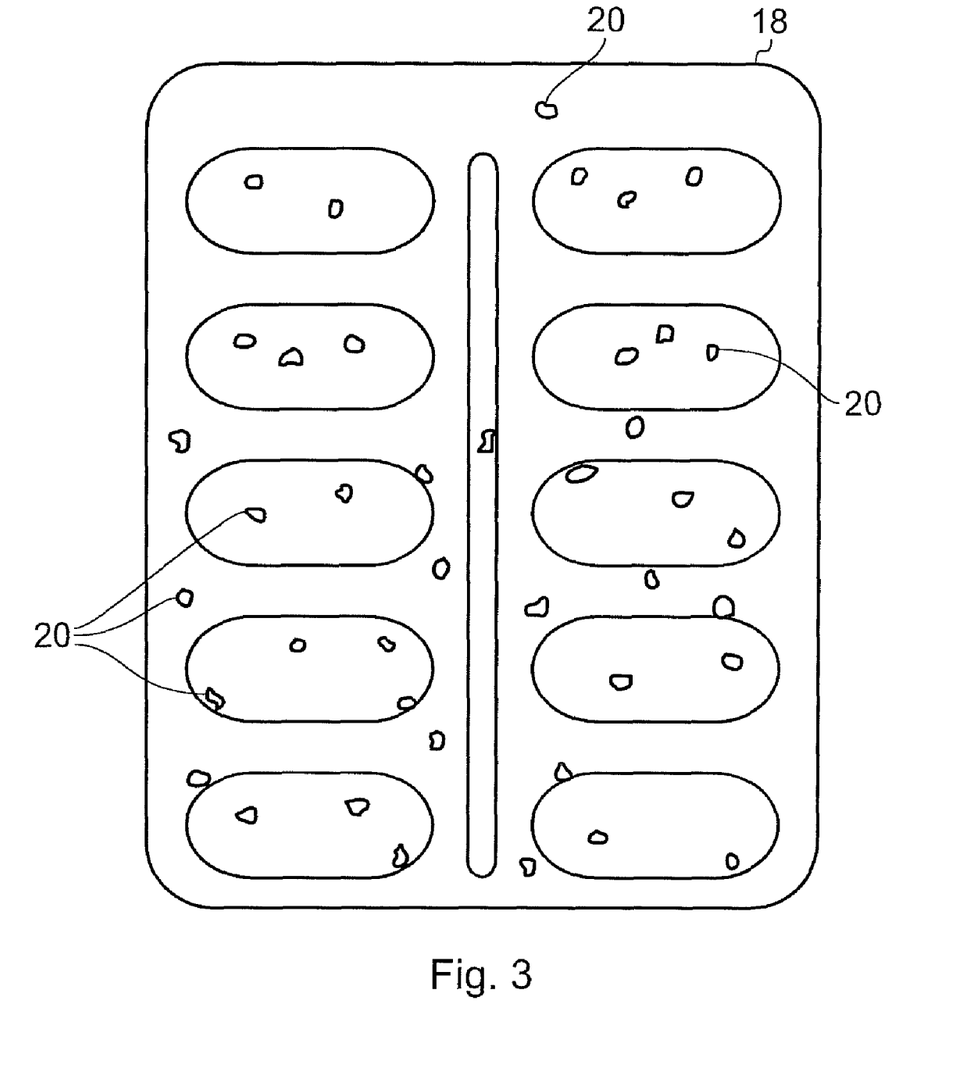
FIG. 3 is a plan view of a pharmaceutical pack including randomly distributed identifiers as an integral part of the blister pack for the pharmaceutical product.

In the arrangement shown in FIG. 1, the marker 4 was attached to the packaging in a tamper evident way. However it is apparent that the sprinkling of optical elements, such as glass beads, random plastic or glass, or other materials, whether they be transparent or coloured, can be performed during the manufacture of blister pack. FIG. 3 illustrates an upper side (non-foil bearing side) of a blister pack 18 in which random optical elements 20 were sprinkled into the plastic packaging during its manufacture or otherwise attached or adhered thereto after manufacture such that the pack exhibits a unique pattern of reflection when scanned by a suitable scanner.

Figure 5:
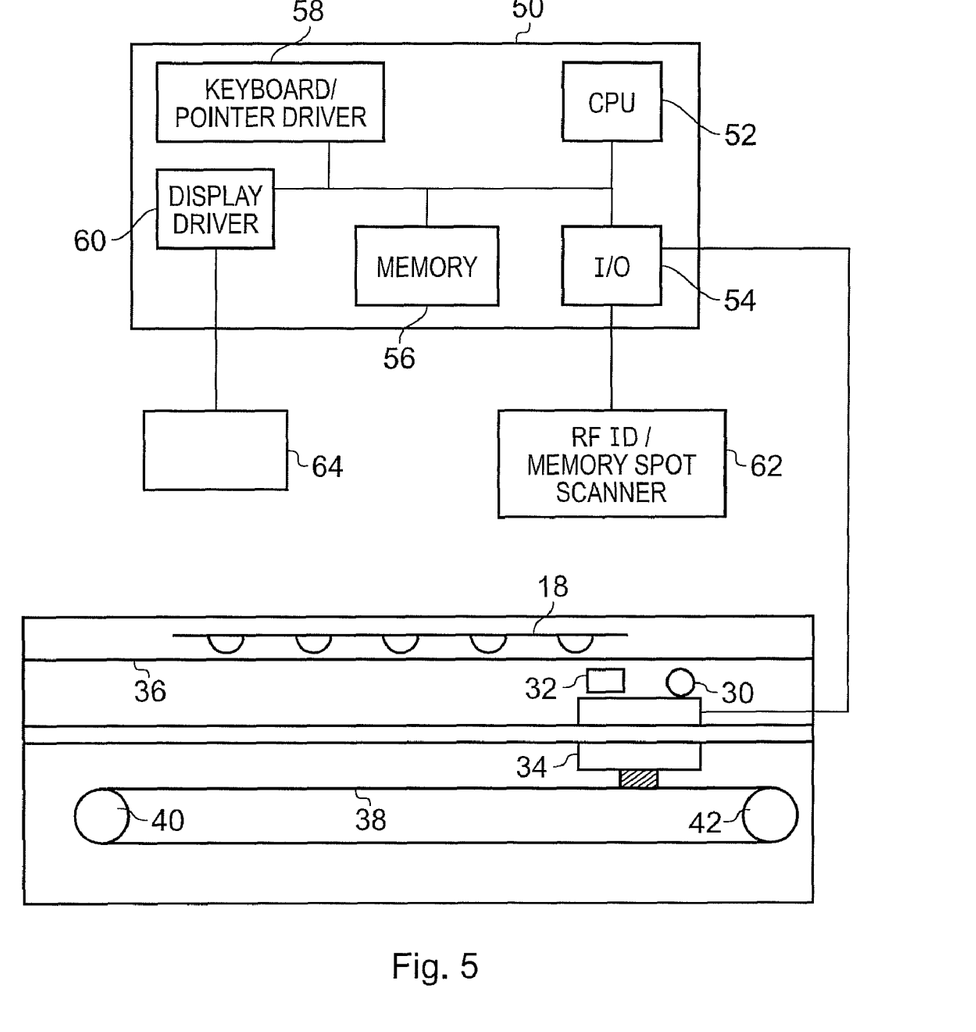
FIG. 5 shows a validation station constituting an embodiment of the present invention.

A scanner is schematically illustrated in FIG. 5. It comprises an optical source 30 and a photodetector array 32 mounted on a movable carriage 34 beneath a flat bed 36. The carriage 34 is driven by a belt 38 which extends between a driven roller 40 and an undriven roller 42. Thus, the scanner uses commonly available flat bed scanner technology. An output of the scanner is provided to a data processor 50 which includes a CPU 52, a scanner interface 54, memory 56, and human interface devices, such as a keyboard and pointer driver 58 and a display driver 60. The input output interface 54 also interfaces with an RF ID or memory spot scanner 62. The display driver drives a user readable display 64. The data processor 50 may also include connectivity, for example via the internet, to a master database such that it can record the fact that drugs have been dispensed and can also supply an identity of the memory device together, optionally, with an image or parameterised version of the scanned image of the pack such that the manufacturer can record the fact that drugs have been dispensed and can also monitor for the occurrence of packages being presented which are suspect, either because the memory element is non-functional or because the data in the memory element and the image of the package do not agree. Reference to an external database facilitates the identification of attempts to counterfeit products where several packages have been manufactured with the same allegedly random pattern thereon and where the memory element has been encoded for that pattern.

In some embodiments of the reader terminal, an LCD screen may be used in order to display a second one of the "shares" and a user can place the package beneath the transparent LCD screen and the image will then be viewable only to them and they can verify this with a further rendition of the image displayed on a separate screen. The data for the second share and the image may be stored within the memory device or one or either parts of the data may be retrieved from a remote database.

It is thus possible to provide packaging where the expense and effort that a counterfeiter must go to is significantly increased, and whereby information on the packaging is tightly bound with information held within a memory device attached to the product or the packaging and where the user can quickly and easily confirm without reference to an external database that the packaging and the device were paired together at manufacture. Reference to an external database can, however, be used in order to provide further confidence in the integrity of the anti-counterfeit packaging and also to enable an bona fide manufacturer to check the delivery of the products.

Figure 6:
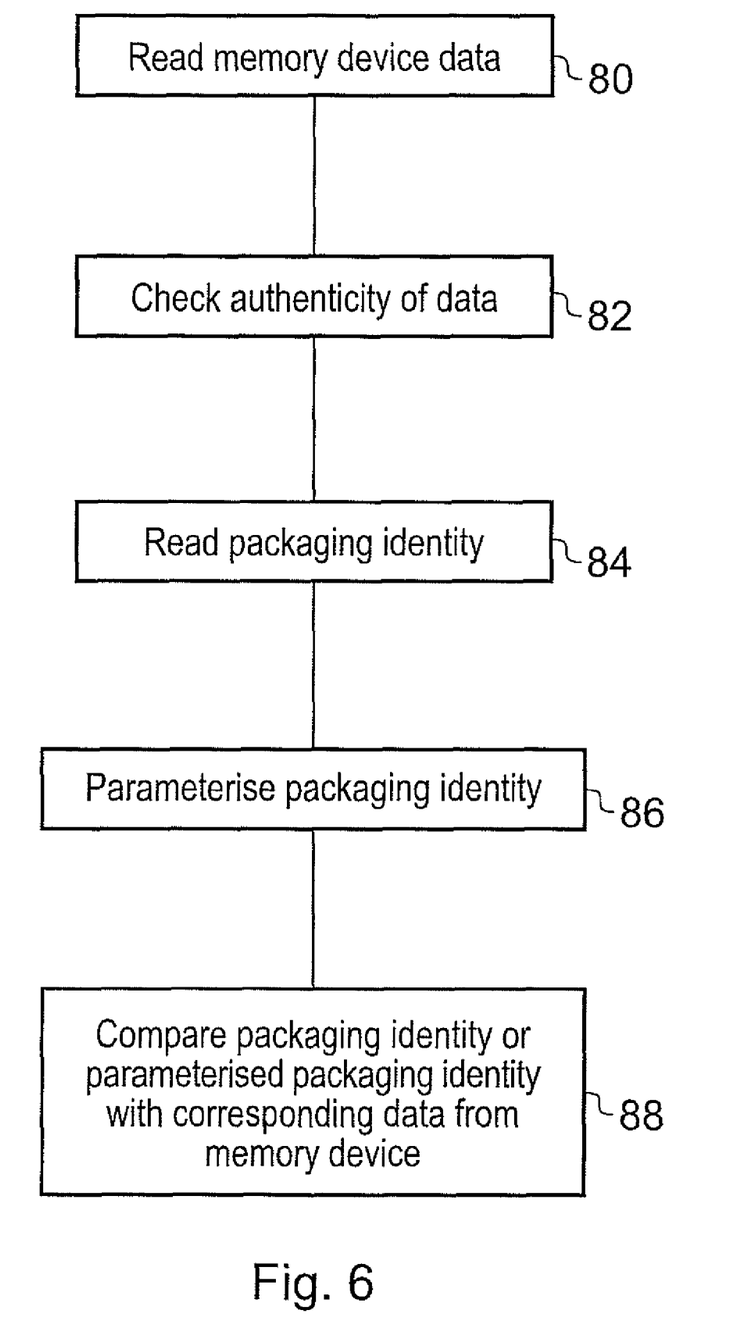
FIG. 6 is a flow chart of a validation process constituting an embodiment of the invention.

FIG. 6 shows the steps involved in validating a package. The process starts at step 80 where the reader interrogates the memory device so as to read its data. Control may then optionally pass to step 82 where the authenticity of the data can be checked. This can for example include validating that the data was signed by the manufacturer, or may include accessing a manufacturer's or trusted third party's database to seek information that validates the data contained in the memory device. Control then passes to step 84 where the package data, such as the random, unique marker and counterfeit resistant marker may be parameterised or encoded to reduce its size. Finally control is passed to step 88 where the data about the marker and the data from the memory device are compared. If they match then a signal is displayed to assure a purchaser or user that the package has not been tampered with and that the contents are not counterfeit. If the data do not match, then a warning is displayed.

The capability within the memory devices to store information about the number of times they have been interrogated can be utilised to further enhance security of the system. Thus, for example, a manufacturer may write data to the device and then encode the device such that it will only reveal its data one more time. Persons in the distribution channel are then warned not to interrogate the device such that if a malicious person in the supply chain does attempt to copy the packaging by reading data off the memory device, then the device shuts itself down, or issues a warning or fails to deliver its information until presented with a further activation key.

The packaging may include other indicia, such as a bar code or numeric identifier which enables a query to be made to a database in order to obtain an image or encoded representation of the security tag 4 and/or the second share of the visual cryptogram. The data retrieved from the database could itself be encrypted with information known only to the memory device. Alternatively, the data stored in the memory device could be a representation of the image of the security tag 4 and that image could be held in encrypted form with the key only being accessible by access to a remote database. This provides enhanced security and reliability to the scanning process. The visual cryptogram may then be regarded as a second level of authentication because it enables the user to visually confirm that the package has not been tampered with.

Each of the memory device, random marker and share of the visual cryptogram are tamper evident such that their appearance or condition can be visually assessed by a user to determine if they have been subject to interference.

The memory device may be used in a referential system where the reader has to contact a remote database to retrieve data that enables the information on the memory device to be read, such as obtaining a decryption key, on where the data in the memory device is itself a pointer to identification data that is retrieved from a remote database.

The invention claimed is:

1. Anti-counterfeit marking for a product, comprising:
a tamper evident marker attached to or integrated with a product or packaging for a product and having a random distribution of optical elements within a substrate; and
an electronic memory element containing data about the marker, the memory element being attached to or integrated with the product or packaging for the product in a tamper evident manner.

2. An anti-counterfeit marking as claimed in claim 1, wherein the optical elements comprise two dimensional patterns.

3. An anti-counterfeit marking as claimed in claim 1, wherein the optical elements comprise objects randomly embedded within the substrate.

4. An anti-counterfeit marking as claimed in claim 3, wherein the plurality of objects have a color or other optical properties that differ from the substrate.

5. An anti-counterfeit marking as claimed in claim 1, wherein essential connections within the electronic memory element are exposed to an adhesive which binds the memory element to the product or packaging.

6. An anti-counterfeit marking as claimed in claim 1, further including a first share of a visual cryptogram attached to or integrated within the product in a tamper evident way.

7. An anti-counterfeit marking as claimed in claim 6, wherein a second share of the visual cryptogram is removeably included with the product or its packaging.

8. An anti-counterfeit marking as claimed in claim 6, wherein a representation of the second share of the visual cryptogram is stored within the electronic memory element and is configured to be accessed to control an electronic share element in order to validate the authenticity of the packaging.

9. An anti-counterfeit marking as claimed in claim 1, wherein the memory element keeps a record of the number of times the memory element has been read by a reader and disables itself once the memory element has been read more than a predetermined number of times.

10. A method of detecting a counterfeit product comprising the steps of:
reading from a memory device attached to a product or the packaging of the product in a tamper evident manner data concerning a tamper evident marker having a random distribution of optical elements within a substrate, wherein the tamper evident marker is also attached to the product or the packaging for the product;
taking a validating measurement of the tamper evident marker; and
comparing the validating measurement with the data from the memory device.

11. A method as claimed in claim 10, wherein the optical elements comprise a plurality of objects or discontinuities within the substrate.

12. A method as claimed in claim 10, wherein the product further comprises a random identifier comprising a first portion of a visual cryptogram, and wherein a second portion of the visual cryptogram is attached to or formed in the product or product packaging.

13. A method as claimed in claim 10, wherein the random identifier comprises data from a trusted party and then stored in the memory device.

14. An anti-counterfeit packaging comprising:
a memory device intimately associated with the packaging in a tamper evident manner and including data therein to enable a further identifier on the packaging to be validated; and
a tamper evident marker attached to or integrated with the packaging and having a random distribution of optical elements within a substrate.

15. An anti-counterfeit packaging as claimed in claim 14, wherein essential connections within the memory device are exposed to an adhesive which binds the memory device to the packaging.

16. An anti-counterfeit packaging as claimed in claim 14, wherein the optical elements comprise objects randomly embedded within the substrate.

17. An anti-counterfeit packaging as claimed in claim 16, wherein the plurality of objects have at least one of a color and another optical property that differs from at least one of a color and another optical property of the substrate.

18. An anti-counterfeit marking as claimed in claim 14, wherein the memory device keeps a record of the number of times the memory device has been read by a reader and disables itself once the memory device has been read more than a predetermined number of times.

19. An anti-counterfeit marking as claimed in claim 14, further including a first share of a visual cryptogram attached to or integrated within the packaging in a tamper evident way.

20. An anti-counterfeit marking as claimed in claim 19, wherein at least one of a second share of the visual cryptogram is removeably included with the packaging and a representation of the second share of the visual cryptogram is stored within the memory device and is configured to be accessed to control an electronic share element in order to validate the authenticity of the packaging.

* * * * *

UNITED STATES PATENT AND TRADEMARK OFFICE
CERTIFICATE OF CORRECTION

| | | |
|---|---|---|
| PATENT NO. | : 8,123,126 B2 | |
| APPLICATION NO. | : 12/374615 | |
| DATED | : February 28, 2012 | |
| INVENTOR(S) | : Helen Balinsky et al. | |

It is certified that error appears in the above-identified patent and that said Letters Patent is hereby corrected as shown below:

In column 6, line 66, in Claim 18, delete "marking" and insert -- packaging --, therefor.

In column 7, line 4, in Claim 19, delete "marking" and insert -- packaging --, therefor.

In column 7, line 7, in Claim 20, delete "marking" and insert -- packaging --, therefor.

Signed and Sealed this
Sixth Day of November, 2012

David J. Kappos
*Director of the United States Patent and Trademark Office*